United States Patent [19]

Gupta

[11] Patent Number: 4,467,869

[45] Date of Patent: Aug. 28, 1984

[54] METHOD TO REDUCE SULFONATE LOSS IN MICELLAR FLOODING

[75] Inventor: Surendra P. Gupta, Tulsa, Okla.

[73] Assignee: Standard Oil Company, Chicago, Ill.

[21] Appl. No.: 478,563

[22] Filed: Mar. 24, 1983

Related U.S. Application Data

[63] Continuation-in-part of Ser. No. 248,740, Mar. 30, 1981, abandoned.

[51] Int. Cl.³ .............................................. E21B 43/22
[52] U.S. Cl. ..................................... 166/273; 166/274
[58] Field of Search ................. 166/273, 274, 252, 275

[56] References Cited

U.S. PATENT DOCUMENTS

| | | | |
|---|---|---|---|
| 3,343,597 | 9/1967 | Gogarty et al. | 166/273 |
| 3,467,190 | 9/1969 | Dunlap et al. | 166/252 |
| 3,482,631 | 12/1969 | Jones | 166/273 |
| 3,648,770 | 3/1972 | Sydansk et al. | 166/252 |
| 3,888,309 | 6/1975 | Rhudy et al. | 166/274 |
| 3,915,230 | 10/1975 | Flournoy et al. | 166/252 |
| 4,074,755 | 2/1978 | Hill et al. | 166/252 |
| 4,078,607 | 3/1978 | Carter et al. | 166/274 |
| 4,143,716 | 3/1979 | Kalfoglou et al. | 166/274 |
| 4,250,961 | 2/1981 | Morse et al. | 166/273 X |
| 4,262,746 | 4/1981 | Hammett | 166/273 |

OTHER PUBLICATIONS

Gupta et al. "Micellar Flooding–Compositional Effects on Oil Displacement", *Society of Petroleum Engineers Journal.*

Primary Examiner—Stephen J. Novosad
Attorney, Agent, or Firm—Scott H. Brown; Fred E. Hook

[57] ABSTRACT

An improved method of oil recovery for use within an underground formation having an ion exchange capacity. An aqueous micellar fluid bank containing a surfactant is injected into the formation followed by an injection of the bank with a mobility control fluid, such as a polymer-thickened aqueous solution, into the formation. The mobility control fluid has a salt level lower than or equal to the salt level of the micellar fluid, but a greater divalent cation-to-monovalent cation ratio than the micellar fluid make-up brine, preconditioning brine or original in-place brine in a reservoir in order to reduce the hardness of the formation fluids in situ generated at the trailing edge of the micellar fluid which in turn reduces the surfactant loss from the micellar fluid.

13 Claims, 3 Drawing Figures

PRODUCED CALCIUM AND SULFONATE BEHAVIOR FOR TEST 5.
(ALL IJECTED FLUIDS CONTAINED 52ppm CALCIUM)

PRODUCED CALCIUM AND SULFONATE BEHAVIOR FOR TEST 5.
(ALL INJECTED FLUIDS CONTAINED 52ppm CALCIUM)

TABLE 2

SULFONATE LOSS IN BRINE SATURATED CORES

| TEST NO. | PRECONDITIONING AND MICELLAR MAKE-UP BRINE | | | | POLYMER BRINE | | | | SULFONATE LOSS* (LBS. OF SULFONATE/BBL. OF ROCK VOLUME CONTACTED) |
|---|---|---|---|---|---|---|---|---|---|
| | TDS (ppm) | Na$^+$ (ppm) | Ca$^{++}$ (ppm) | $\dfrac{Ca^{++}}{Na^+}$ | TDS (ppm) | Na$^+$ (ppm) | Ca$^{++}$ (ppm) | $\dfrac{Ca^{++}}{Na^+}$ | |
| 1 | 12214 | 4733 | 52 | 0.0110 | 12214 | 4733 | 52 | 0.0110 | 0.80 |
| 2 | 8214 | 3160 | 52 | 0.0615 | 8214 | 3160 | 52 | 0.0165 | 1.08 |
| 3 | 4214 | 1588 | 52 | 0.0328 | 4214 | 1588 | 52 | 0.0328 | 0.93 |
| 4 | 214 | 15 | 52 | 3.4670 | 214 | 15 | 52 | 3.4670 | 0.96 |
| 5 | 12214 | 4733 | 52 | 0.0110 | 214 | 15 | 52 | 3.4670 | 0.21 |

*AVERAGE VALUE BASED ON 2 TO 3 TESTS

TABLE 3

SULFONATE LOSS IN PRESENCE OF WATERFLOOD RESIDUAL OIL SATURATION IN CORES

| TEST NO. | PRECONDITIONING AND MICELLAR MAKE-UP BRINE | | | | POLYMER BRINE | | | | SULFONATE LOSS* (LBS. OF SULFONATE/BBL. OF ROCK VOLUME CONTACTED) | FINAL OIL SATURATION AFTER MICELLAR FLOODING** (% PV) |
|---|---|---|---|---|---|---|---|---|---|---|
| | TDS (ppm) | $Na^+$ (ppm) | $Ca^{++}$ (ppm) | $\frac{Ca^{++}}{Na^+}$ | TDS (ppm) | $Na^+$ (ppm) | $Ca^{++}$ (ppm) | $\frac{Ca^{++}}{Na^+}$ | | |
| 1 | 12214 | 4733 | 52 | 0.0110 | 12214 | 4733 | 52 | 0.0110 | 0.95 | 8.7 |
| 2 | 8214 | 3160 | 52 | 0.0615 | 8214 | 3160 | 52 | 0.0165 | 1.01 | 12.7 |
| 3 | 4214 | 1588 | 52 | 0.0328 | 4214 | 1588 | 52 | 0.0328 | 1.13 | 16.3 |
| 4 | 214 | 15 | 52 | 3.4670 | 214 | 15 | 52 | 3.4670 | 1.11 | 25.1 |
| 5 | 12214 | 4733 | 52 | 0.0110 | 214 | 15 | 52 | 3.4670 | 0.49 | 4.6 |

*AVERAGE VALUE BASED ON 2 TO 3 TESTS
**AVERAGE WATERFLOOD RESIDUAL OIL SALIENATION WAS 35% PV

METHOD TO REDUCE SULFONATE LOSS IN MICELLAR FLOODING

Related U.S. Application Data

This application is a Continuation-in-Part of Ser. No. 248,740, filed Mar. 30, 1981, now abandoned.

BACKGROUND OF THE INVENTION

1. Field of the Invention

The present invention relates to an improved enhanced oil recovery method and, more particularly, to such a method for use within a micellar flood program.

2. Setting of the Invention

It is well known that in micellar flooding the surface active agent or surfactant has a tendency to adhere to the rock media's surface as well as to the interface between the oil and water and be lost from the fluid. This surfactant loss or retention, which greatly reduces the effectiveness of the micellar flood, is caused by adsorption, phase trapping, and sulfonate-polymer incompatibility. The sulfonate loss depends primarily on the ionic conditions, i.e., salinity and hardness, of the polymer water and not of the micellar fluid. In particular, sulfonate loss depends on the in situ generated compositions at the trailing edge of the micellar fluid where mixing with polymer water occurs. Various methods and procedures have been suggested for optimizing the micellar flood process. For example, U.S. Pat. No. 3,343,597 suggests preceding the injection of an oil miscible micellar dispersant by injecting an "insulating" water slug having an ionic content matching that of the water and the micellar dispersion. Also, U.S. Pat. No. 3,467,190 suggests that injecting an aqueous surfactant slug having an optimized salt concentration for providing a minimum interfacial tension against a reservoir oil and preceding or following that slug with an aqueous solution of the same salt concentration whenever the salt concentration of the formation water or drive water differs from the optimum concentration. U.S. Pat. No. 3,482,631 suggests that where an oil-displacing fluid contains an electrolyte, the adsorption of the electrolyte when the equilibrium is established at the junction between the injection fluid and the reservoir water is reduced by injecting a preflood solution having a selected electrolyte concentration of an effective viscosity at least equaling that of the reservoir fluid. U.S. Pat. No. 3,648,700 suggests determining which cation is predominant in the formation water and injecting a micellar dispersant containing a petroleum sulfonate and a cation which has a greater affinity for the sulfonate than the predominant cation in the reservoir water. U.S. Pat. No. 3,915,230 suggests preceding an aqueous surfactant system of optimum salinity and hardness with a thickened aqueous preflush solution of the same salinity and hardness. Patents listed above indicate that where the formation water is highly saline or contains a relatively large multivalent cations, it may be impossible, or at least uneconomical, to formulate an optimum surfactant slug having the ionic composition of the formation water. U.S. Pat. No. 4,074,755 teaches that a salinity contrast in the micellar flooding may be used. This patent suggests that the micellar flooding process should be designed such that the calcium-to-sodium ratio is identical in all brines in order to eliminate ionic exchange.

In actual operation, it has been found that even by utilizing the procedures of the patents listed above, significant surfactant loss still occurs. Furthermore, unfavorable ion exchange is not eliminated by maintaining identical calcium-to-sodium ratios in all brines. This is because the surfacant itself initiates an ion exchange process.

Figure 1:
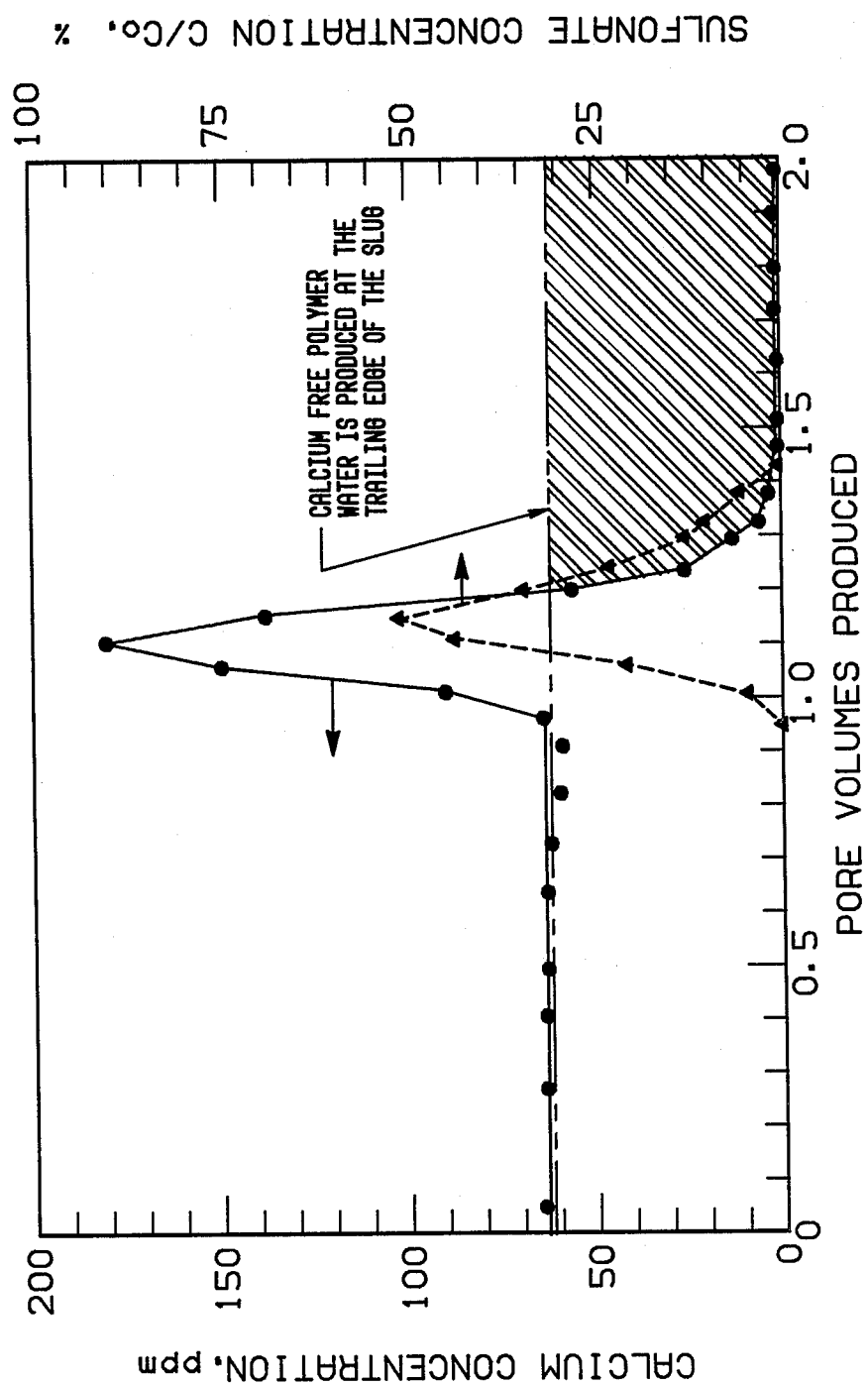
FIG. 1 of the drawing illustrates a graph showing the favorable ion exchange behavior in a test core due to salinity contrast embodying the present invention.

TABLE 2 shows sulfonate loss in brine saturated cores and as a function of total dissolved salts (TDS), calcium hardness, and calcium-to-sodium ratio, and TABLE 3 shows sulfonate loss in the presence of a waterflood residual oil saturation and as a function of TDS, calcium hardness and calcium-to-sodium ratio.

SUMMARY OF THE INVENTION

The present invention relates to a novel method of oil recovery using micellar flooding which is contemplated to overcome foregoing disadvantages. A method of this invention is comprised of injecting a bank of aqueous micellar fluid containing a surfactant into an underground oil formation which has an ion exchange capacity, such as a formation clay. Make-up brine for the aqueous micellar formulation contains added monovalent cations to the available "fresh" water in a field. An example of added monovalent cations is sodium chloride salt. The "fresh" water available in the field invariably contains some divalent cations, for example, calcium ions. This results in a low ratio of calcium to sodium ions in the make-up brine for the micellar fluid. A bank of mobility control fluid, such as polymer water, is thereafter injected into the formation to displace the oil towards the production wells. In order to reduce surfactant loss from the micellar fluid, the mobility control fluid is formulated to have a total salt level lower than or equal to the salt level of the micellar fluid, but a greater divalent cation-to-monovalent cation ratio than the micellar fluid so that the hardness in the formation fluids at the trailing edge of the micellar slug where mixing with polymer water occurs is removed, thereby reducing the surfactant loss.

DESCRIPTION OF THE PREFERRED EMBODIMENTS

After a waterflood program has beed completed, a micellar flood program can be initiated. In order to practice the present invention, the formation water and the available fresh water as well as the formation ion characteristics are checked in order to determine the optimum range of salinity and hardness in the most effective micellar flood. In that this procedure is old in the art, then no effort is made to describe this procedure. A preflush or preconditioning water may be injected into the formation to change the salinity and hardness levels of the in-place water. After the injection of the preconditioning water, a micellar fluid containing a surfactant as well as possibly alcohol, cosurfactant brine, or a polymer-thickened solution, is injected into the formation. The exact contents of the micellar fluid are determined prior to injection with regard to the formation chemical characterisitics as well as the preconditioning water chemical composition. The micellar fluid upon injection in contact with oil passes through a phase change necessary to reduce the interfacial tension to overcome the capillary forces within the formation.

This enables displacement of the trapped oil from the formation. Following the micellar fluid, a bank of mobility control fluid is injected into the formation. The mobility control fluid is normally a polymer-thickened aqueous solution which pushes and/or displaces the micellar fluid and oil to the production wells.

In order to reduce the surfactant loss from the injected micellar fluid, the divalent cation-to-monovalent cation ratio in the micellar fluid and the mobility control fluid are optimally selected. Throughout the present discussion, the divalent cation is considered calcium but also may include barium and magnesium. Also, the monovalent cation will be sodium but also may include potassium or ammonium. It has been found that by injecting the mobility control fluid with a chemical concentration such as to remove hardness, such as calcium, from the fluids in situ generated at the trailing edge of the micellar fluid, the surfactant loss from the micellar fluid is greatly reduced, thereby greatly increasing the effectiveness of the oil recovery process. This phenomenon is explained below. The in-place brine, injected preconditioning fluid and injected micellar fluid should have a lower calcium-to-sodium ratio than the mobility control fluid or the polymer water. With this technique, the clays within the formation would be primarily in the sodium state with the monovalent cation with the in-place brine, injected preconditioning fluid and injected micellar fluid. However, a favorable ion exchange will take place when a polymer water having a salt level lower than or equal to the salt level of the micellar fluid, but a higher calcium-to-sodium ratio displaces the in-place or micellar fluid having a lower calcium-to-sodium ratio. In this process, the calcium from the injected polymer water will exchange for the sodium from the clays. Removal of the hardness from the polymer water has been found to greatly reduce the sulfonate loss. Again, this is because the sulfonate loss in micellar flooding is controlled by the in situ generated salinity and hardness conditions at the trailing edge of the micellar fluid where mixing with polymer water occurs. Reference is herein made to the paper by S. P. Gupta and S. P. Trushenski entitled "Micellar Flooding—Compositional Effects on Oil Displacement", SPE 7063, 5th Symposium on Improved Methods for Oil Recovery, Tulsa, Okla., April 16-19, 1978 (which is herein incorporated by reference). In addition, even a slight removal of hardness from the polymer water will result in considerably reduced sulfonate loss because the Schluze-Hardy rule from the surface chemistry teaches that the activities of various salts for the colloidal stability are in the ratio of 100:1.6:0.14 for mono-, di-, and trivalent salts.

The above concept has been demonstrated in the laboratory displacement tests conducted in sandstone cores. These tests were conducted without and with crude oil displacements. The brine for preconditioning the core and for making an aqueous micellar formulation contains added sodium chloride salt to a typical fresh water available in fields (52 ppm divalent cations, 15 ppm sodium, and 214 ppm total dissolved solids). The micellar formulation contained 6.43 wt % petroleum sulfonate, 1.25 wt % isopropyl alcohol and the remaining was polymer thickened make-up brine. The brine used for polymer mobility bank also contained added sodium chloride salt to the above discussed fresh water. The calcium-to-sodium ratio in various brines was adjusted by changing the level of added sodium chloride to the fresh water. Test procedures are described in Table 1.

TABLE 1

| | Test Procedures |
|---|---|
| 1. | Inject 10 PV 3N NaCl brine |
| 2. | Inject 6 PV of preconditioning brine |
| 3. | Inject 0.10 PV micellar slug |
| 4. | Inject 2.0 PV polymer water |
| 5. | Determine sulfonate produced |

Notes
(a) Test flow rate of 2 ft/day
(b) core length of 12 inches
(c) core either contained 100% brine saturation or waterflood residual oil saturation.
(d) micellar fluid contained 6.43% petroleum sulfonate, 1.25% isopropyl alcohol and 92.32% polymer thickened preconditioned brine.
(e) polymer water contained 900-1600 ppm partially hydrolyzed polyacrylamide (Pusher 700 =).
(f) sulfonate loss calculated by material balance, i.e., sulfonate loss - sulfonate injected - sulfonate produced.

Sulfonate loss in brine saturated cores and as a function of total dissolved salts (TDS), calcium hardness and calcium-to-sodium ratio are shown in Table 2. It is noted from Tests 1 to 4 that sulfonate loss is independent of TDS level. In each of the four tests, the calcium-to-sodium ratio was the same for preconditioning brine, micellar make-up brine and polymer brine. In these tests sulfonate loss varies from 0.8 to 1.1 lbs of sulfonate per barrel of pore volume contacted and is primarily controlled by the hardness present in the brine. It is also noted from Test 5 that over the same salinity range, sulfonate loss is reduced to 0.2 lbs/bbl when calcium-to-sodium ratio is increased from the micellar make-up brine to the polymer brine. This is a 4 to 5 fold reduction in sulfonate loss by using the teachings of the present invention. This reduction in sulfonate loss is due to generation of calcium free fluids within the core. This is dramatically noted by the calcium concentration in the produced fluids as shown in FIG. 1 for Test 5 of Table 2. It is shown that initially the produced ppm of calcium within the produced water is stable until it rises at 1.0 PV of the produced fluids when sulfonate breakthrough occurs, indicating that the calcium from the rock surfaces transfers into the fluid as a consequence of an ion exchange process initiated by the micellar fluid; thereafter the calcium disappears from the produced polymer water indicating that the calcium from the injected polymer water has adhered back to the rock. It has been shown that by using a mobility control fluid with a lower total dissolved salt but a higher calcium-to-sodium ratio than the micellar fluid, a favorable ion exchange will occur which reduces the presence of the divalent cation (calcium) from the fluids within the formation which greatly reduces the surfactant loss.

Sulfonate loss, in the presence of a waterflood residual oil saturation and as a function of TDS, calcium hardness and calcium-to-sodium ratio are shown in Table 3. The results are similar to the ones discussed previously, i.e., sulfonate loss is greatly reduced by using a mobility control fluid with a higher calcium-to-sodium ratio than in the micellar fluid. Furthermore, this technique results in lower final oil saturation after micellar flooding which means that pounds of sulfonate required per barrel of oil produced is greatly reduced.

Whereas the present invention is described in particular relation to the drawing test hereto, it should be understood that other and further modifications apart from those shown or suggested herein may be made within the scope and spirit of this invention.

I claim:

1. Method of improved oil recovery from an underground oil formation having an ion exchange capacity and which is penetrated by injection and production wells comprising:
   (a) injecting a bank of aqueous micellar fluid into the formation, and
   (b) injecting a bank of mobility control fluid into the formation, wherein the mobility control fluid has a lower salt level but a greater divalent cation-to-monovalent cation ratio than the micellar fluid in order to reduce surfactant loss from the micellar fluid.

2. Method of claim 1 wherein the surfactant is sulfonate.

3. The method of claim 1 wherein the mobility control fluid is a polymer-thickened aqueous solution.

4. The method of claim 1 wherein the divalent cation is calcium.

5. The method of claim 1 wherein the monovalent cation is sodium.

6. The method of claim 1 wherein the formation contains clay.

7. Method of improved oil recovery from an underground oil formation with significant ion exchange capacity and which is penetrated by injection and production wells, comprising:
   (a) injecting a preconditioning fluid into the formation to alter the monovalent cation concentration of the formation,
   (b) injecting a bank of aqueous micellar fluid into the formation, and
   (c) injecting a bank of mobility control fluid into the formation, wherein the mobility control fluid has a lower salt level but a greater divalent cation-to-monovalent cation ratio than the micellar fluid in order to reduce surfactant loss from the micellar fluid.

8. Method of claim 7 wherein the surfactant is sulfonate.

9. The method of claim 7 wherein the mobility control fluid is a polymer-thickened solution.

10. The method of claim 7 wherein the divalent cation is calcium.

11. The method of claim 7 wherein the monovalent cation is sodium.

12. The method of claim 7 wherein the formation contains clay.

13. Method of improved oil recovery from an underground oil formation having an ion exchange capacity and which is penetrated by injection and production wells comprising:
   (a) injecting a bank of aqueous micellar fluid into the formation, and
   (b) injecting a bank of mobility control fluid into the formation, wherein the mobility control fluid has a salt level lower than or equal to the salt level of the micellar fluid, and the mobility control fluid has a greater divalent cation-to-monovalent cation ratio than the micellar fluid in order to reduce surfactant loss.

* * * * *